(12) United States Patent
Watanabe

(10) Patent No.: US 7,310,112 B1
(45) Date of Patent: Dec. 18, 2007

(54) INFORMATION RECORDING DEVICE AND COMMUNICATION METHOD THEREOF, ELECTRONIC CAMERA, AND COMMUNICATION SYSTEM

(75) Inventor: Mikio Watanabe, Asaka (JP)

(73) Assignee: FUJIFILM Corporation, Kanagawa (JP)

( * ) Notice: Subject to any disclaimer, the term of this patent is extended or adjusted under 35 U.S.C. 154(b) by 777 days.

(21) Appl. No.: 09/678,333

(22) Filed: Oct. 3, 2000

(30) Foreign Application Priority Data

Oct. 4, 1999 (JP) ................................ 11-283125

(51) Int. Cl.
*H04N 5/225* (2006.01)
*H03D 1/00* (2006.01)

(52) U.S. Cl. ........................... 348/207.1; 348/207.11; 348/552; 375/338; 375/339

(58) Field of Classification Search ................ 348/735, 348/726, 737, 211.1–211.3, 211.5, 207.1, 348/207.11, 211.9, 552; 375/338, 339, 344, 375/346, 326, 219, 295; 455/85, 86, 570, 455/113, 140, 141, 164.1, 208, 209, 227, 455/114.2, 117, 127.1, 127.5
See application file for complete search history.

(56) References Cited

U.S. PATENT DOCUMENTS

| | | | | |
|---|---|---|---|---|
| 4,802,201 A | * | 1/1989 | Yoshizawa et al. | 455/411 |
| 5,806,005 A | * | 9/1998 | Hull et al. | 455/566 |
| 5,821,995 A | * | 10/1998 | Nisikawa | 348/211.5 |
| 5,847,662 A | * | 12/1998 | Yokota et al. | 340/10.34 |
| 5,959,622 A | * | 9/1999 | Greer et al. | 715/719 |
| 6,204,877 B1 | * | 3/2001 | Kiyokawa | 348/211.3 |
| 6,233,016 B1 | * | 5/2001 | Anderson et al. | 348/372 |
| 6,477,605 B1 | * | 11/2002 | Taki et al. | 710/302 |
| 6,493,027 B2 | * | 12/2002 | Ohta et al. | 348/220.1 |
| 6,714,260 B1 | * | 3/2004 | Pine | 348/724 |
| 2002/0011932 A1 | * | 1/2002 | Rodgers et al. | 340/572.1 |

FOREIGN PATENT DOCUMENTS

| | | | |
|---|---|---|---|
| JP | 63228857 | * | 3/1987 |
| JP | 04098996 A | * | 3/1992 |
| JP | 09037125 | * | 2/1997 |
| JP | 2000134531 A | * | 5/2000 |

\* cited by examiner

*Primary Examiner*—Lin Ye
*Assistant Examiner*—Yogesh Aggarwal
(74) *Attorney, Agent, or Firm*—Birch, Stewart, Kolasch & Birch, LLP

(57) ABSTRACT

An information recording device in which low-noise and clear image or audio information can be recorded by stopping the generation of a carrier in an oscillation section of wireless communication device during an imaging or sound recording process. The information recording device includes an electronic camera having recording unit which can record at least either image or audio information; wireless communication unit for transmitting the information to external equipment through wireless communication; a transmitting section including an oscillation section for generating a carrier used for the wireless communication; and imaging/image processing control unit for controlling the generation and stop of the carrier; and the imaging/image processing control unit causes the oscillation section to stop the generation of a carrier at least for a period from the time when the image or audio information is captured to the time when the image or audio information is recorded, low-noise and clear image or audio information can be recorded.

1 Claim, 4 Drawing Sheets

INFORMATION RECORDING DEVICE AND COMMUNICATION METHOD THEREOF, ELECTRONIC CAMERA, AND COMMUNICATION SYSTEM

BACKGROUND OF THE INVENTION

1. Field of the Invention

The present invention relates to an information recording device and a communication method thereof, an electronic camera, and a communication system, and in particular, to an information recording device and a communication method thereof, an electronic camera, and a communication system, which allow for transmission of information through wireless communication.

2. Description of Related Art

Projection information captured by an electronic camera or audio information recorded by a voice recording device can be handled more simply if it is transmitted to external equipment through wireless communication rather than through cabling. Such wireless communication may be useful especially for long-distance transmission.

However, a recent electronic camera or voice recording device suffers from the disadvantages that, if its carrier belongs to a frequency band of 1 GHz or higher, any high-frequency noise emitted from its carrier oscillator may steal into a signal in the electronic camera and voice recording device, since they have been downsized to a considerable extent.

SUMMARY OF THE INVENTION

The present invention has been achieved in view of the problems described above and it is an object of the present invention to provide an information recording device and a communication method thereof, an electronic camera, and a communication system, which can record and transmit low-noise and clear image or audio information with an information communication function through wireless communication.

To attain these and other objects, the present invention is directed to an information recording device, comprising: a recorder which can record at least either image or audio information; wireless a communication device for transmitting the information to external equipment through wireless communication; an oscillation section for generating a carrier for the wireless communication device; and a controller for controlling the generation and stop of the carrier, in which the controller causes the oscillation section to stop the generation of a carrier at least for a period from the time when the image or audio information is captured to the time when it is recorded.

According to the present invention, there are included a recorder which can record at least either image or audio information; a wireless communication device for transmitting the information to external equipment through wireless communication; an oscillation section for generating a carrier for the wireless communication device; and a controller for controlling the generation and stop of the carrier, and the controller causes the oscillation section to stop the generation of a carrier at least for a period from the time when the image or audio information is captured to the time when it is recorded, low-noise and clear image or audio information can be recorded.

To attain these and other objects, the present invention is directed to an electronic camera which transmits a captured image to external equipment through wireless communication, comprising: a communication device for stopping wireless oscillation at least during an imaging process.

According to the present invention, since the electronic camera has a communication device for stopping wireless oscillation at least during an imaging process, low-noise and clear image or audio information can be recorded.

To attain these and other objects, the present invention is directed to a communication system, comprising the above-mentioned electronic camera and external equipment which has a storage medium for storing an image received from the electronic camera, wherein, before going into the semi-stop state, the electronic camera notifies the external equipment that it will go into the semi-stop state and after stopping the semi-stop state, it notifies the external equipment that it has been released from the semi-stop state; and in response to the notification of semi-stop state received from the electronic camera, the external equipment keeps the connection therewith and supplies a synchronization signal.

According to the present invention, since before going into the semi-stop state, the electronic camera notifies the external equipment that it will go into the semi-stop state and after stopping the semi-stop state, it notifies the external equipment that it has been released from the semi-stop state; and in response to the notification of semi-stop state received from the electronic camera, the external equipment keeps the connection therewith and supplies a synchronization signal, low-noise and clear image or audio information can be transmitted efficiently.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENT

Preferred embodiments of an information recording device and a communication method thereof, an electronic camera, and a communication system according to the present invention will be described below in detail with reference to the accompanying drawings.

Figure 1:
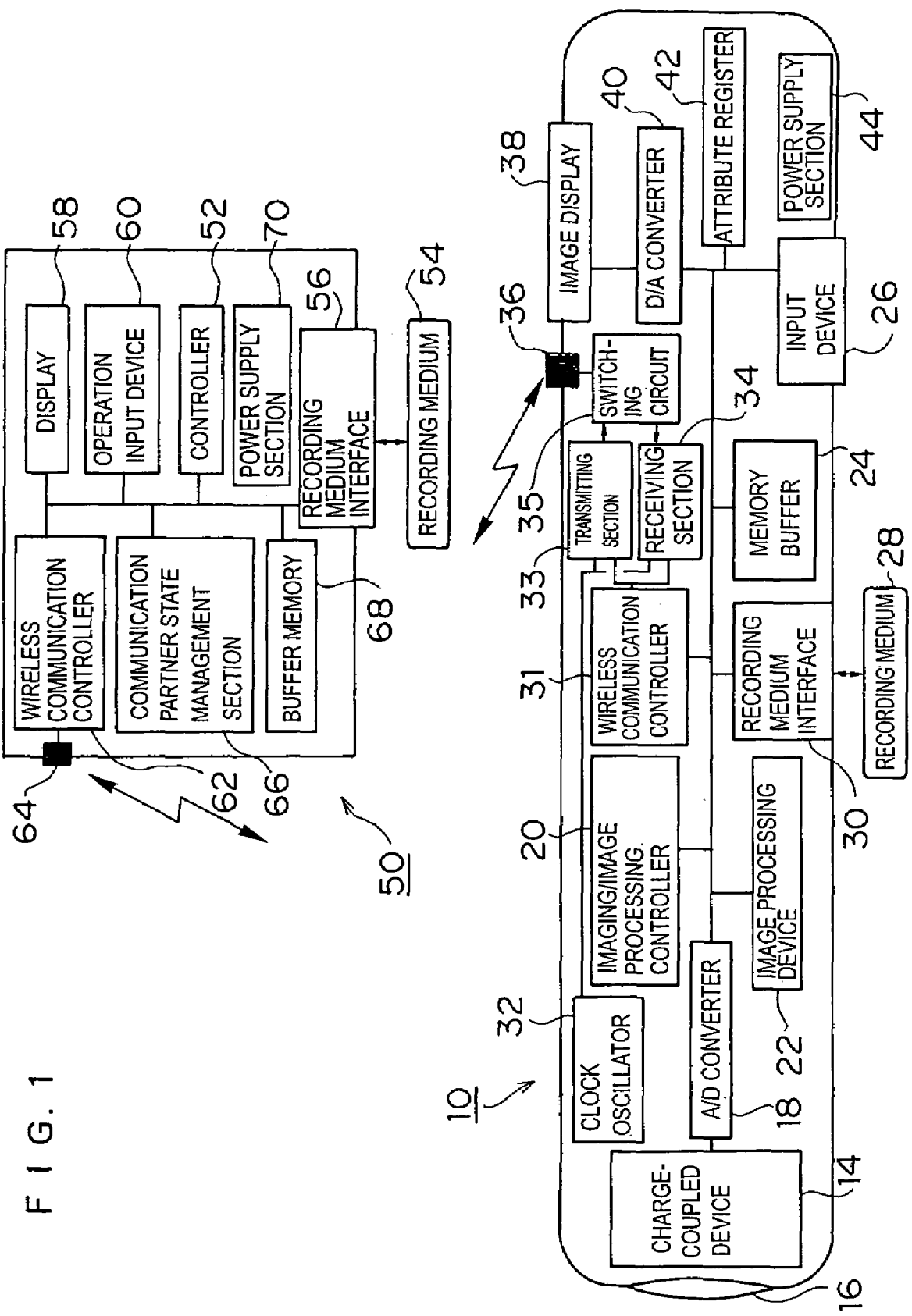
FIG. 1 is a block diagram for showing an embodiment of an information recording device (electronic camera) according to the present invention.

FIG. 1 is a block diagram for showing an embodiment of an information recording device (electronic camera) according to the present invention.

An electronic camera 10 comprises a lens group 16 for forming an image of an object on a CCD (charge-coupled device) 14, the CCD (charge-coupled device) 14 for photo-electrically converting the formed image of the object to an analog signal of the image and providing the signal as an output, an A/D converter 18 for converting the analog signal of the image provided by the CCD 14 to a digital signal, an imaging/image processing control device 20 for controlling the entire electronic camera 10 as well as the timing for sampling image data according to the form of captured image data, an image processing device 22 for image sizing, sharpness correction, gamma correction, contrast control, and white balancing, a memory buffer 24 for temporarily storing image data, an input device 26 having a recording button, a communication button, a transmission button, function switches, cursor keys, and a confirmation switch (all of which are not shown) provided for the electronic camera 10, and a recording medium interface 30 for compressing image data and other information through some techniques represented by JPEG or motion JPEG, expanding such compressed data, and converting data to be recorded on or read from a removable recording medium 28.

The recording medium 28 is a removable semiconductor magnetic/optical recording medium such as a memory card or MO. The electronic camera 10 as configured above also functions as means for recording formed images. It should be appreciated that the electronic camera may be configured by recording audio information as well, although components necessary for audio functions are not shown in the drawing.

A wireless communication device of the electronic camera 10 used for receiving from or transmitting to external equipment image data comprises a wireless communication controller 31, a transmitting section 33 which includes an oscillation section for generating a carrier for wireless communication based on a transmission frequency signal generated by a clock oscillator 32 and transmits data on the carrier, a receiving section 34 which separates data transmitted on the carrier based on a reception frequency signal generated by the clock oscillator 32, a switching circuit 35 which switches between data transmission and data reception, and an antenna 36 through which data with a carrier is transmitted or received.

In addition, the electronic camera 10 has a D/A converter 40 for displaying image data on a display 38, an attribute register 42 in which the attribute of a communication partner is stored, and a power supply section 44 which supplies electric power to each element provided for the electronic camera 10. It should be appreciated that the imaging/image processing controller 20 has a ROM in which operation programs and constants have been stored and a RAM which is a storage device used as a working area during the program execution, although they are not shown in the drawing.

There are three settings which can be enabled based on instructions from the imaging/image processing controller 20: "semi-stop state" where only a receiving operation is valid and the generation of a carrier used for communication is stopped by stopping an oscillation operation of only the transmitting section 33; "stop state" where any transmitting/receiving operation is stopped by stopping all of the clock oscillator 32, the transmitting section 33, and the receiving section 34; and "full operation state" where a transmitting/receiving operation is enabled by activating all of the clock oscillator 32, the transmitting section 33, and the receiving section 34.

A home server 50 shown in FIG. 1 includes a controller 52 for controlling the overall process in the home server 50, a removable recording medium 54 for recording operation programs and image or other data, and a recording medium interface 56 for compressing image data and other information through some techniques represented by MJPEG or MPEG, expanding such compressed data, and converting data to be recorded on or read from the removable recording medium 54. The recording medium 54 is a removable semiconductor magnetic/optical recording medium such as a memory card or MO.

In addition, the home server 50 has a display 58 for displaying character data or image data, an input device 60 used by the user to provide data or to instruct a desired action to the home server 50, a wireless communication controller 62 including an oscillation section for transmitting to or receiving from the electronic camera 10 or other external equipment some data, an antenna 64 through which data with a carrier is transmitted or received, a communication partner state management section 66 in which the attribute of a communication partner is stored, a buffer memory 68 for temporarily storing image data, and a power supply section 70 which supplies electric power to each element provided for the home server 50. It should be appreciated that the home server 50 may comprise a communication device which allows for communication with public circuits.

The imaging process of the electronic camera 10 as configured above will be described below.

An image of an object is formed on the light receiving plane of the CCD (charge-coupled device) 14 through the lens group 16. The image is photoelectrically converted to charge signals whose amount depends on the amount of incident light detected by each sensor in the CCD. In response to imaging timing signals, charge signals accumulated in the CCD 14 are provided therefrom in sequence and then converted by the A/D converter 18 to R, G, B digital image data. The resulting image data is subjected to a process for amplification or noise reduction in the image processing device 22 and then stored in the memory buffer 24 temporarily. The imaging/image processing control device 20 sequentially transmits the image data stored in the memory buffer 24 to the D/A converter 40 for display on the display 58.

When the recording button provided for the input device 26 is pressed, the electronic camera 10 goes into imaging mode. Then, the imaging/image processing controller 20 performs a process which causes the recording medium interface 30 to record the image data on the recording medium 28 in sequence. When the transmission button provided for the input device 26 is pressed, the imaging/image processing controller 20 performs a process to read out the specified image data from the recording medium 28 in sequence and to convert it to a specified format for transmission to external equipment through the wireless communication controller 31, the transmitting section 33, the switching circuit 35, and the antenna 36.

It should be appreciated that in the home server 50, the controller 52 may be responsive to an instruction from the user to temporarily store the image data recorded on the recording medium 54 or the image data acquired through the wireless communication controller 62 in the buffer memory 68 and then transmit it to the display 58 for display of the specified image.

Figure 2:
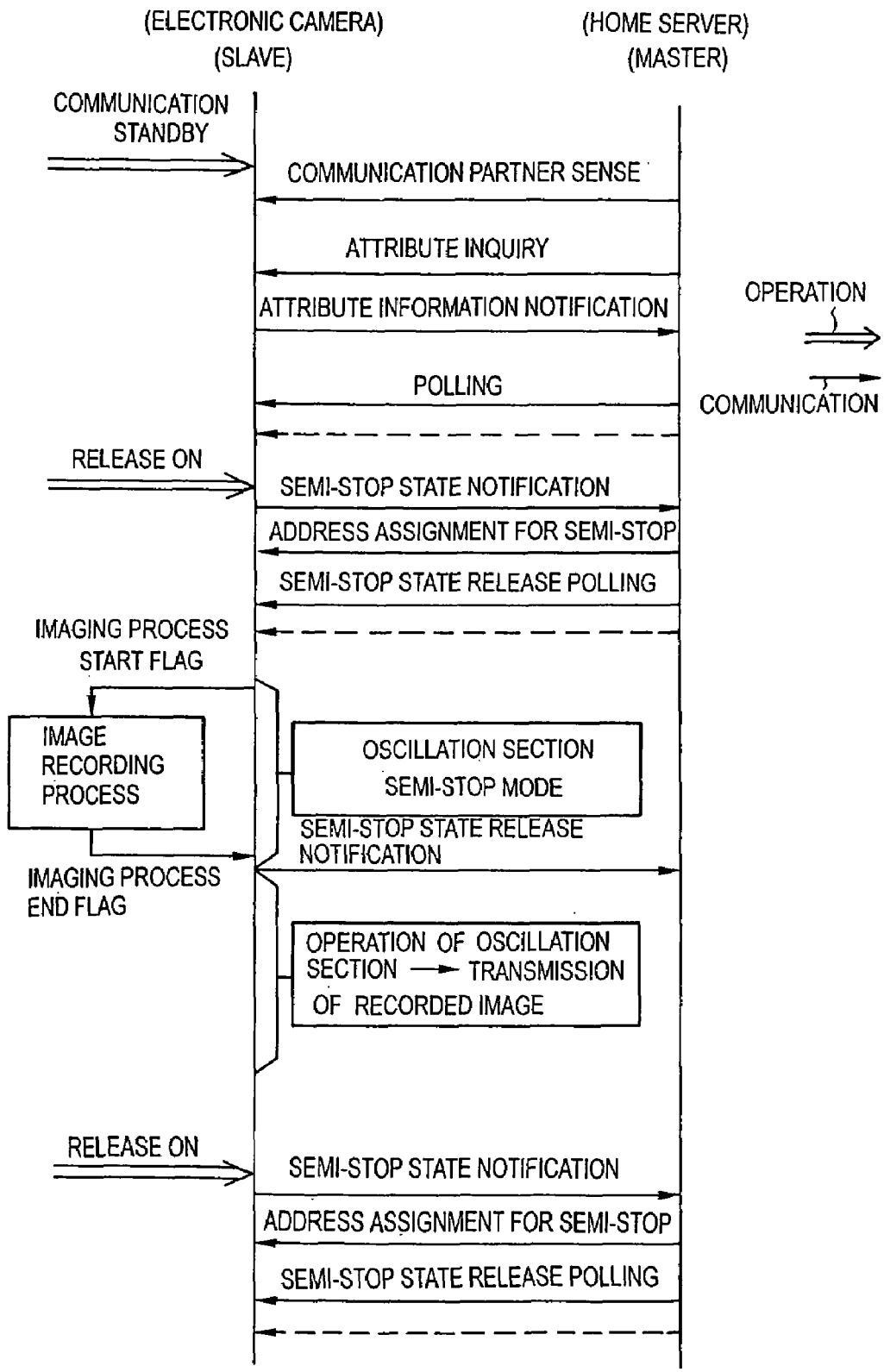
FIG. 2 shows a communication procedure employing a communication method of an information recording device and a communication system according to the present invention.

FIG. 2 shows a communication procedure employing a communication method of an information recording device and a communication system according to the present invention.

This drawing shows a procedure for communication between the home server 50 on the master side and the electronic camera on the slave side.

In the drawing, when the communication button provided for the input device 26 of the electronic camera 10 is pressed, the electronic camera 10 is set in communication mode to activate the wireless communication controller 31, the clock oscillator 32, and the transmitting section 33, that is, the electronic camera 10 goes into "full operation state" and thus into "communication standby state." The home server 50 continuously transmits a "communication partner sense" signal to sense whether or not any external equipment as a communication partner is newly placed into communication standby state. When the home server 50 senses any external equipment communicating therewith, it issues an instruction to "inquire the attribute" of the external equipment. The electronic camera 10 which is newly participating in the network notifies the home server 50 of some information indicating its attribute. In this way, the home server 50 recognizes the electronic camera 10 which is newly participating in the communication network and distributes its unique address to establish a connection handshake.

When the connection handshake is established, the home server 50 periodically performs "polling" to inquire the status or request of each external equipment attached thereto. The electronic camera 10 is responsive to the inquiry from the home server 50 to return a response.

It should be appreciated that, upon request from the electronic camera 10 to transmit image data, the home server 50 enables the reception of image data and then receives the image data from the electronic camera 10, although such an operation is not shown in the drawing.

When the release switch provided for the input device 26 of the electronic camera 10 is pressed to start an imaging process, the electronic camera 10 sends to the home server 50 a "semi-pause state notification" to pause the transmission by stopping the oscillation section in the transmitting section 33. This notification allows the home server 50 to recognize that the communication of the electronic camera 10 goes into semi-pause state and to assign a temporary address for semi-pause to the electronic camera 10 in order to easily recognize the electronic camera 10 again when the communication is released from the semi-pause state.

Thereafter, the home server 50 starts "semi-pause state release polling" which is a synchronization signal to sense whether or not the communication of the electronic camera 10 is released from the semi-pause state. The electronic camera 10 is enabled to perform only the receiving operation because it is placed into the semi-pause state. Therefore, if it receives "semi-pause state release polling" information, it cannot respond to it but it will sense the synchronization signal and confirm the synchronization between them. It should be also appreciated that the home server 50 keeps the communication established between the electronic camera 10 and it for a predetermined period of time. Therefore, if no notification of semi-pause state release is received from the electronic camera 10 when the predetermined period of time has elapsed, the home server 50 may stop the communication with the electronic camera 10 based on the determination that the electronic camera 10 leaves the communication range or that the power supply is turned off.

Next, the electronic camera 10 stops the oscillation operation in the transmitting section 33 and performs an image recording process with considerably reduced noise from the transmitting section 33. Simply by placing the transmitting section into stop state during the image recording process in this way, low-noise and clear image can be obtained even with an electronic camera which is capable of wireless communication.

When the image recording process of the electronic camera 10 ends, the electronic camera 10 goes into transmission enable state by returning the oscillation section of the transmitting section 33 to oscillation state and sends a "semi-stop state release notification" to the home server 50. When the transmission button provided for the input device 26 of the electronic camera 10 is pressed to instruct to transmit captured image data, the electronic camera 10 requests the home server 50 to transmit the image data and then the home server 50 enables the reception of the image data and the recorded image data is transmitted from the electronic camera 10.

When the release switch provided for the input device 26 of the electronic camera 10 is pressed again to start an imaging process, the process is performed in a similar manner to that described above.

It should be appreciated that the present invention has been described above with reference to the example where the communication is placed into "semi-stop state" by stopping the oscillation section of the transmitting section 33 when the image recording process of the electronic camera 10 starts. However, the present invention is not limited to this example and the object of the present invention can be attained by stopping the oscillation operation of the transmitting section 33 as well as the function of at least either the clock oscillator 32 or the receiving section 34 to set the communication in "stop state" when an imaging process starts.

It should be also appreciated that the present invention has been described above with reference to the example where the transmission of image data is activated by pressing the transmission button after the image is captured. However, the present invention is not limited to this example and the object of the present invention can be attained by starting the transmission of image data automatically after the image is captured or by sequentially transmitting image data together after images are captured consecutively. In addition, it should be appreciated that since the power consumption of the electronic camera 10 can be reduced by keeping the oscillation section of the transmitting section 33 in stop state, the transmitting section of the electronic camera 10 may be placed into semi-stop state as required for power saving, irrespective of the imaging process.

Figure 3:
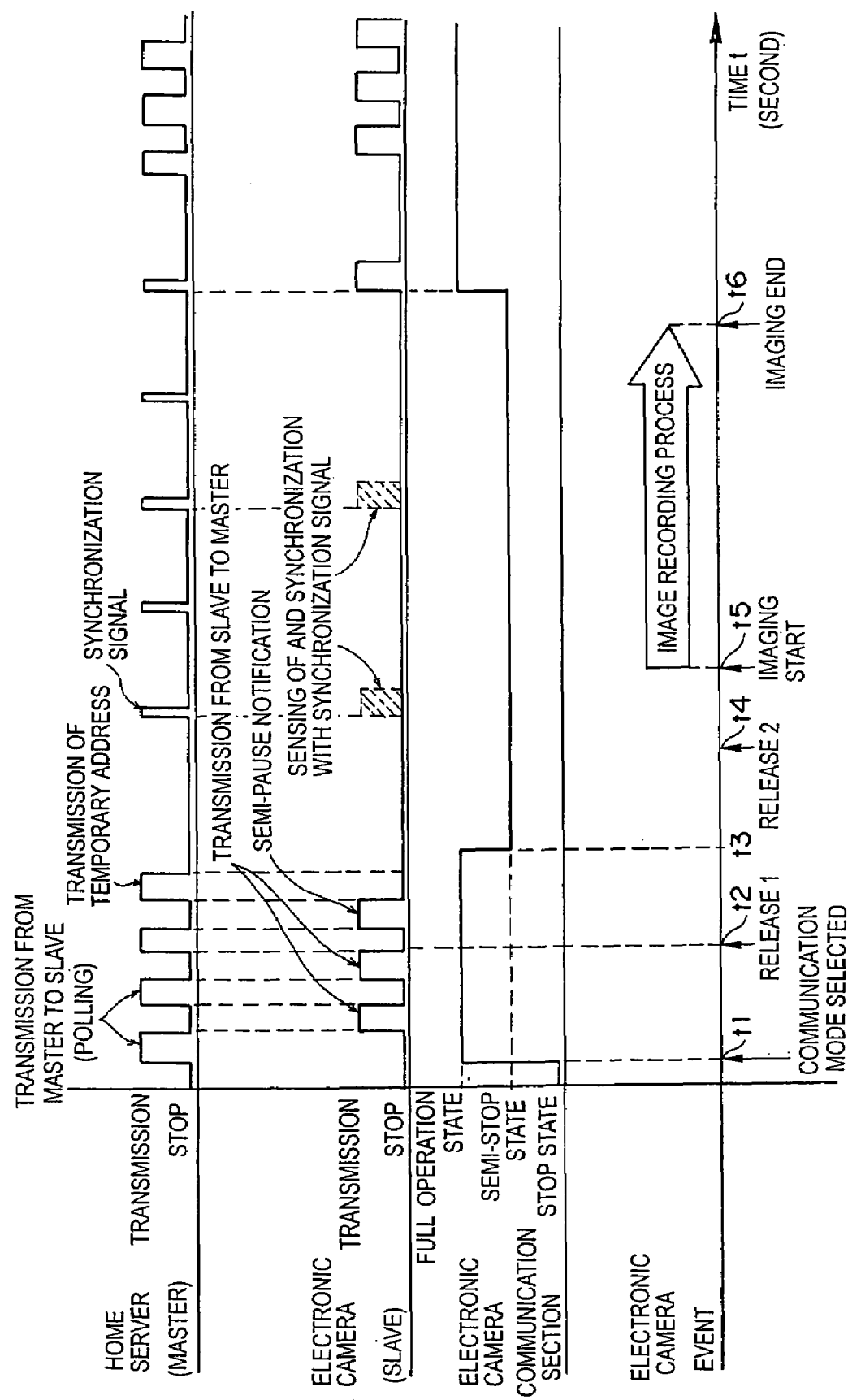
FIG. 3 is a time chart for showing the communication between a home server and an electronic camera and various events occurring in the electronic camera employing a communication method of an information recording device and a communication system according to the present invention.

FIG. 3 is a time chart for showing the communication between the home server 50 and the electronic camera 10 and various events occurring in the electronic camera 10 employing a communication method of an information recording device and a communication system according to the present invention.

In the drawing, when the communication button provided for the input device 26 of the electronic camera 10 is pressed at the time $t_1$, the electronic camera 10 is selected to be in communication mode to activate the wireless communication controller 31, the clock oscillator 32, the transmitting section 33, and the receiving section 34, that is, the electronic camera 10 goes into "full operation state." The home server 50 as master equipment continuously transmits a "communication partner sense" signal to sense whether or not any slave equipment as a communication partner is newly placed into communication standby state. The electronic camera 10 as slave equipment is responsive to the signal from the home server 50 to return a response.

When the release switch provided for the input device 26 of the electronic camera 10 is pressed down to a first step at the time $t_2$ to start an imaging preparation process, the electronic camera 10 sends to the home server 50 a "semi-pause state notification" to pause the transmission by stopping the oscillation section in the transmitting section 33. This notification allows the home server 50 to recognize that the communication of the electronic camera 10 goes into semi-pause state and to assign a temporary address for semi-pause to the electronic camera 10 in order to easily recognize the electronic camera 10 again when the communication is released from the semi-pause state. Upon receipt of that information, the electronic camera 10 sets the communication section to "semi-stop state" by placing the oscillation section in the transmitting section 33 into stop state at the time $t_3$.

Thereafter, the home server 50 starts "semi-pause state release polling" which is a synchronization signal to sense that the communication of the electronic camera 10 is released from the semi-pause state. According to the present embodiment, the electronic camera 10 is enabled to perform only the receiving operation because it is placed into the semi-pause state. Therefore, if it receives "semi-pause state release polling" information, it cannot respond to it but it will sense the synchronization signal and confirm the synchronization between them.

When the release switch is pressed down to a second step at the time $t_4$, the electronic camera 10 starts to prepare for an image recording process. Then the electronic camera 10 performs the image recording process during a period from the time $t_5$ to the time $t_6$ with considerably reduced noise from the transmitting section 33.

When the image recording process of the electronic camera 10 ends, the electronic camera 10 goes into transmission enable state by returning the oscillation section of the transmitting section 33 to oscillation state and sends a "semi-stop state release notification" to the home server 50. When the transmission button provided for the input device 26 of the electronic camera 10 is pressed to instruct to transmit captured image data, the recorded image data is transmitted from the electronic camera 10 to the home server 50, although such an operation is not shown in the drawing.

Figure 4:
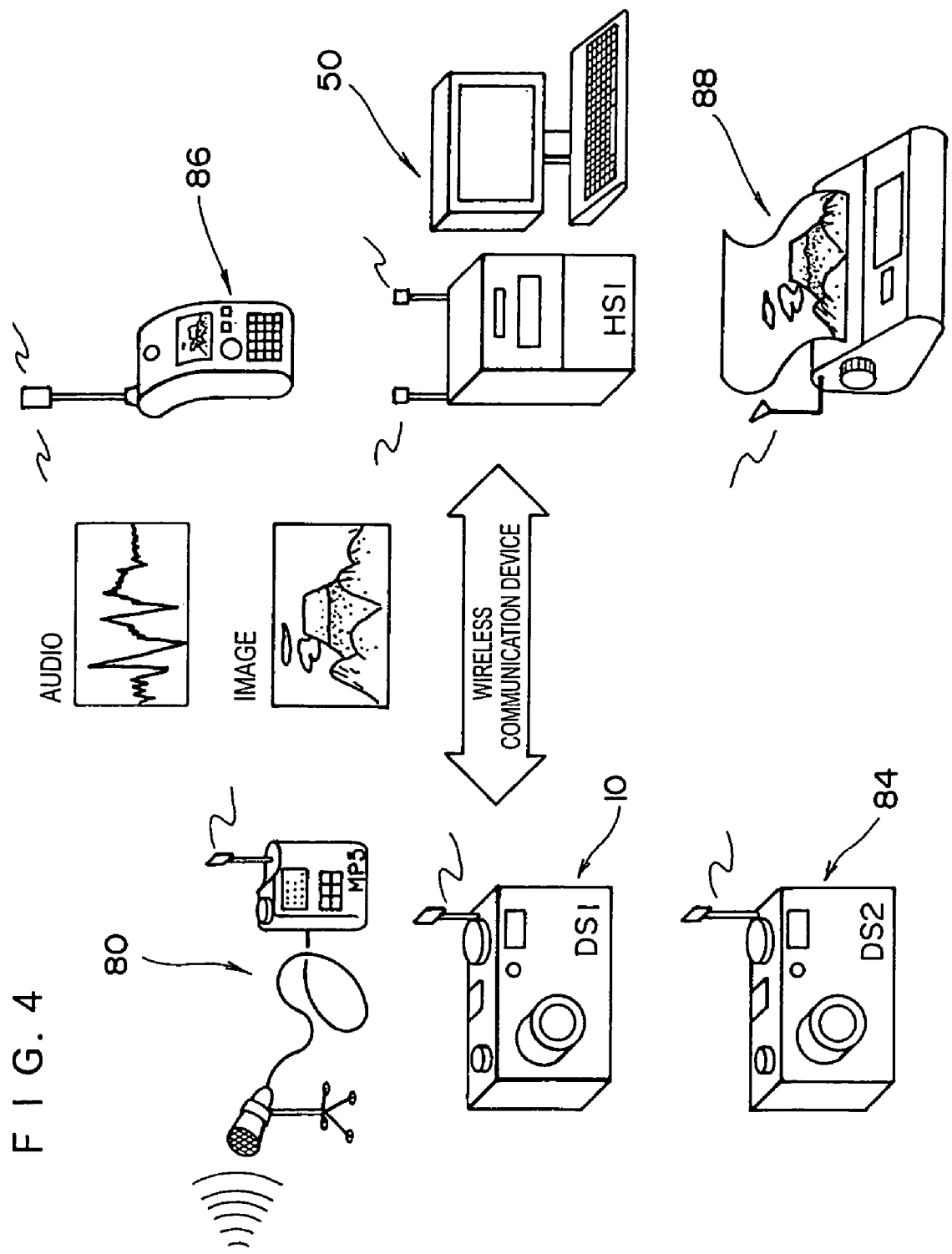
FIG. 4 shows a system configuration for an information recording device and a communication method thereof, an electronic camera, and a communication system according to the present invention.

FIG. 4 shows the system configuration for an information recording device and a communication method thereof, an electronic camera, and a communication system according to the present invention.

In the drawing, by employing the information recording device and the communication method thereof according to the present invention, image data or audio data recorded by a voice recording device 80 or electronic cameras 10, 84 with fewer noise components can be transmitted through wireless communication device to a home server 50, a telephone set 86, a printer 88, or other equipment. Even when the electronic cameras 10, 84 used as master equipment are of the same model, individual slave equipment can be recognized and managed separately by the master equipment recognizing the slave equipment which is newly participating in the communication network and identifying its unique address.

As described above, with the information recording device according to the present invention, since it includes a recorder which can record at least either image or audio information; a wireless communication device for transmitting the information to external equipment through wireless communication; an oscillation section for generating a carrier for the wireless communication device; and a controller for controlling the generation and stop of the carrier; and the controller causes the oscillation section to stop the generation of a carrier at least for a period from the time when the image or audio information is captured to the time when it is recorded, low-noise and clear image or audio information can be recorded.

With the electronic camera according to the present invention, since it has communication device for stopping wireless oscillation at least during an imaging process, low-noise and clear image or audio information can be recorded.

With the communication system according to the present invention, since before going into the semi-stop state, the electronic camera notifies the external equipment that it will go into the semi-stop state and after stopping the semi-stop state, it notifies the external equipment that it has been released from the semi-stop state; and in response to the notification of semi-stop state received from the electronic camera, the external equipment keeps the connection therewith and supplies a synchronization signal, low-noise and clear image or audio information can be transmitted efficiently.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An information recording device, comprising:
   a recorder which can record at least either image or audio information;
   a wireless communication device for transmitting said information to external equipment through wireless communication;
   a carrier generating section for generating a carrier for said wireless communication device; and
   a controller for controlling the generation and pause of said carrier,
   wherein said controller causes said carrier generating section to pause the generation of the carrier when the information recorder receives an instruction to capture an image, and the controller causes the carrier generating section, which is transmitting the at least image or audio information, to pause at least for a period from the time when said image or audio information is captured to the time when said image or audio information is recorded, and
   wherein the controller pauses only a carrier oscillation section of the carrier generating section while a clock oscillator of the carrier generating section is active.

* * * * *